US010835856B2

United States Patent
Whitley et al.

(10) Patent No.: US 10,835,856 B2
(45) Date of Patent: *Nov. 17, 2020

(54) CARBON MOLECULAR SIEVE ADSORBENT

(71) Applicant: Air Products and Chemicals, Inc., Allentown, PA (US)

(72) Inventors: Roger Dean Whitley, Allentown, PA (US); Shubhra Jyoti Bhadra, Macungie, PA (US); Erdem Arslan, Macungie, PA (US); Yong Cao, Shanghai (CN); Timothy Christopher Golden, Nantes (FR)

(73) Assignee: Air Products and Chemicals, Inc., Allentown, PA (US)

( * ) Notice: Subject to any disclaimer, the term of this patent is extended or adjusted under 35 U.S.C. 154(b) by 225 days.

This patent is subject to a terminal disclaimer.

(21) Appl. No.: 16/103,115

(22) Filed: Aug. 14, 2018

(65) Prior Publication Data
US 2020/0054986 A1 Feb. 20, 2020

(51) Int. Cl.
*B01D 53/047* (2006.01)

(52) U.S. Cl.
CPC .... *B01D 53/0473* (2013.01); *B01D 2253/102* (2013.01); *B01D 2253/116* (2013.01); *B01D 2256/10* (2013.01); *B01D 2256/12* (2013.01); *B01D 2259/402* (2013.01); *B01D 2259/40005* (2013.01); *B01D 2259/4006* (2013.01);
(Continued)

(58) Field of Classification Search
CPC .... B01D 53/02; B01D 53/0473; B01D 53/06; B01D 2253/102; B01D 2253/116; B01D 2256/10; B01D 2256/12; B01D 2256/18; B01D 2257/104; B01D 2259/40005; B01D 2259/40028; B01D 2259/40013; B01D 2259/40043; B01D 2259/4006; B01D 2259/40062; B01D 2259/402; B01D 2259/403; B01D 2259/404; C01B 13/00; C01B 21/00; C01B 23/00
USPC ..... 95/127, 130, 138, 113, 903; 128/205.27; 502/416

See application file for complete search history.

(56) References Cited

U.S. PATENT DOCUMENTS

| 3,801,513 A | 4/1974 | Munzner et al. |
| 4,458,022 A | 7/1984 | Ohsaki et al. |

(Continued)

FOREIGN PATENT DOCUMENTS

| CN | 202337689 U | 7/2012 |
| CN | 103787285 A | 5/2014 |

(Continued)

OTHER PUBLICATIONS

Babicki, M., et al.; "PSA Technology Hits the Fast Lane"; Chemical Processing; PutmanMedia; Aug. 2003; pp. 1-6.
(Continued)

*Primary Examiner* — Frank M Lawrence, Jr.
(74) *Attorney, Agent, or Firm* — Matthew R. Weaver

(57) ABSTRACT

Disclosed herein are rapid cycle pressure swing adsorption (PSA) process for separating $O_2$ from $N_2$ and/or Ar. The processes use a carbon molecular sieve (CMS) adsorbent having an $O_2/N_2$ and/or $O_2/Ar$ kinetic selectivity of at least 5 and an $O_2$ adsorption rate (1/s) of at least 0.2000 as determined by linear driving force model at 1 atma and 86° F.

25 Claims, 7 Drawing Sheets

(52) U.S. Cl.
CPC ............ *B01D 2259/40013* (2013.01); *B01D 2259/40028* (2013.01); *B01D 2259/40043* (2013.01)

(56) References Cited

U.S. PATENT DOCUMENTS

| | | | |
|---|---|---|---|
| 4,548,799 A | | 10/1985 | Knoblauch et al. |
| 4,742,040 A | | 5/1988 | Ohsaki et al. |
| 4,938,939 A | | 7/1990 | Kuznicki |
| 5,098,880 A | | 3/1992 | Gaffney et al. |
| 5,164,355 A | | 11/1992 | Farris et al. |
| 5,240,474 A | * | 8/1993 | Auvil ............ B01D 53/02 95/96 |
| 5,447,557 A | * | 9/1995 | Golden ............ B01D 53/02 95/96 |
| 5,704,964 A | | 1/1998 | Kaneko et al. |
| 5,871,565 A | * | 2/1999 | Leavitt ............ B01D 53/0476 95/100 |
| 5,972,834 A | | 10/1999 | Ohsaki et al. |
| 6,051,050 A | | 4/2000 | Keefer et al. |
| 6,451,095 B1 | | 9/2002 | Keefer et al. |
| 6,565,628 B2 | | 5/2003 | Xu et al. |
| 6,767,386 B2 | | 7/2004 | Kawai et al. |
| 6,916,358 B2 | | 7/2005 | Nakamura et al. |
| 7,645,324 B2 | | 1/2010 | Rode et al. |
| 7,651,549 B2 | | 1/2010 | Whitley |
| 7,670,408 B2 | | 3/2010 | Ota |
| 8,470,395 B2 | | 6/2013 | Khiavi et al. |
| 9,359,203 B2 | | 6/2016 | Kokubu et al. |
| 9,403,118 B2 | | 8/2016 | Sakamoto et al. |
| 9,669,349 B1 | | 6/2017 | Lau et al. |
| 9,895,646 B2 | | 2/2018 | Monereau et al. |
| 9,925,514 B2 | | 3/2018 | Coe et al. |
| 2002/0121193 A1 | | 9/2002 | Baksh et al. |
| 2006/0169142 A1 | | 8/2006 | Rode et al. |
| 2014/0060326 A1 | | 3/2014 | Sundaram |
| 2014/0076164 A1 | | 3/2014 | Monereau et al. |
| 2017/0144101 A1 | | 5/2017 | Tanaka et al. |
| 2017/0239640 A1 | | 8/2017 | Coe et al. |

FOREIGN PATENT DOCUMENTS

| | | |
|---|---|---|
| CN | 101318634 B | 12/2014 |
| KR | 10-1659760 B1 | 9/2016 |
| WO | 2008/089564 A1 | 7/2008 |
| WO | 2017058486 A1 | 4/2017 |

OTHER PUBLICATIONS

Delgado, J.A., et al.; "Numerical Simulation of a Three-Bed PSA Cycle for the Methane/Nitrogen Separation with Silicalite"; Elsevier; Separation and Purification Technology; vol. 77; 2011; pp. 7-17.

Yavary, M., et al.; "The Effect of Number of Pressure Equalization Steps on the Performance of Pressure Swing Adsorption Process"; Elsevier, Chemical Engineering and Processing; vol. 87; 2015; pp. 35-44.

U.S. Appl. No. 15/718,620, filed Sep. 28, 2017 entitled Processes Using Improved RHO Adsorbent Compositions with first named inventor Shubhra Jyoti Bhadra.

U.S. Appl. No. 15/718,467, filed Sep. 28, 2017 entitled RHO Adsorbent Compositions, Methods of Making and Using Them with first named inventor Magdalena M. Lozinska.

Nakano, Y.;"Control of Micro-pores of Molecular Sieving Carbon by Impregnation of Hydrocarbons and Heat Treatment", Presented at 20th Spring Chemical Industrial Convention; 1987.

Chagger, H.K., et al.; "Kinetics of Adsorption and Diffusional Characteristics of Carbon Molecular Services"; Pergamon; Elsevier Science Ltd.; Carbon vol. 33, No. 10; pp. 1405-1411; 1995.

Chen, Y.D., et al.; "Diffusion of Oxygen, Nitrogen and Their Mixtures in Carbon Molecular Sieve"; AIChE Journal; Apr. 1994; vol. 40, No. 4; pp. 577-585.

Kumar, R., et al.; "A Versatile Process Simulator for Adsorptive Separations"; Pergamon; Elsevier Science Ltd.; Chemical Enginering Science; 1994; vol. 49, No. 18; pp. 3115-3125.

Reid, C.R., et al.; "Adsorption of Gases on Carbon Molecular Sieves Used for Air Separation. Spherical Adsorptives as Probes for Kinetic Selectivity"; Langmuir; 1998; 14; pp. 2415-2425.

Reid, C.R., et al.; "Adsorption of Gases on Carbon Molecular Sieve Used for Air Separation. Linear Adsorptives as Probes for Kinetic Selectivity"; Langmuir; 1999; 15; pp. 3206-3218.

Schork, J.M., et al.; "A Shortcut Computational Method for Designing N2 PSA Adsorbents"; Ind. Eng. Chem. Res.; 1993; vol. 32; pp. 2226-2235.

Walker, P.L., Jr.; "Molecular Sieves"; Mineral Industries; Jan. 1966; pp. 1-7.

Nguyen, C. et al, "Dual Langmuir kinetic model for adsorption in carbon molecular sieve", Langmuir, vol. 16, pp. 1868-1873, 2000.

Sircar S. et al, "Why Does the Linear Driving Force Model for Adsorption Kinetics Work?", Adsorption 2000, 6, 137-147.

Mehrotra, A. et al, "Simplified Graphical Approach for Complex PSA Cycle Scheduling", Adsorption, 2011, 17 337-345.

* cited by examiner

CARBON MOLECULAR SIEVE ADSORBENT

TECHNICAL FIELD

The present invention relates to a rapid cycle pressure swing adsorption (PSA) process for separating $O_2$ from $N_2$ and/or Ar using carbon molecular sieve (CMS) adsorbents.

BACKGROUND

PSA processes have long been used in the separation of the components of air. The use of carbon molecular sieve (CMS) adsorbents to separate varieties of gas mixtures has also been known for several decades (Walker, Jr., P. L., *"Molecular Sieves"*, Mineral Industries, 1966).

The carbon molecular sieve (CMS) adsorbent is usually derived from processing distinct raw materials such as vegetal products (waste wooden materials, coconut shells, walnut shells, fruit kernels), mineral coals, waste mineral oils, waste resin etc. by variety of methods (U.S. Pat. Nos. 3,801,513; 4,458,022; Nakao, Y., *"Control of Micro-pores of Molecular Sieving Carbon by Impregnation of Hydrocarbons and Heat Treatment"*, Presented at $20^{th}$ Spring Chemical Industrial Convention, 1987), wherein ultimately the micro-pores are partially blocked with fine carbon particles which either narrow the pores or change the pore size distribution, thus changing the molecular sieving properties. Selecting an appropriate raw material which provides the initial micro-pore structure and maintaining of proper working parameters (binder type, carbonization time and temperature, hydrocarbon type and concentration for final cracking, cracking time and temperature, addition of inert flow during cooling and so on) are the key factors of getting a suitable CMS adsorbent for size selective separation.

U.S. Pat. No. 4,742,040 discloses several processes for manufacturing a carbon molecular sieve with improved capacity and selectivity that can be applied to the separation of nitrogen from air. U.S. Pat. No. 5,098,880 describes a two-step process of making a carbon molecular sieve having faster oxygen kinetics and high oxygen over nitrogen kinetic selectivity. U.S. Pat. No. 5,164,355 describes a method of producing a high capacity, high density carbon molecular sieve adsorbent which can be used as a host material for further modification to produce an efficient oxygen selective carbon molecular sieve. U.S. Pat. No. 5,972,834 discloses a method of manufacturing carbon molecular sieves suitable for separating oxygen and nitrogen from air involving mainly halogenation and dehalogenation treatments followed by a pore adjustment treatment using a thermally decomposable hydrocarbon (selected from benzene or toluene) on a carbonized charcoal (derived from coconut shell or phenol resin). U.S. Pat. No. 6,916,358 discloses several carbon molecular sieve adsorbents for separating nitrogen from a mixed gas containing nitrogen and oxygen.

Thus, as set out above, there are established methodologies for producing carbon molecular sieve (CMS) adsorbents and for "tuning" the properties of a CMS such that it shows high kinetic selectivity for oxygen over nitrogen or oxygen over argon. Selective micro-pores are introduced to the adsorbent where the pore mouth controls kinetics of oxygen, nitrogen, or argon. This pore mouth or pore entrance is therefore considered as the critical dimension for diffusion. Such micro-pores can exhibit very high selectivity, however this is generally achieved at the expense of overall adsorption rates. The rate of adsorption in CMS adsorbents is, therefore, inversely correlated with the kinetic selectivity. This behavior can be explained by the model presented by Nguyen and Do (Nguyen, C.; Do, D. D., *"Dual Langmuir kinetic model for adsorption in carbon molecular sieve"*, Langmuir, volume 16, pages 1868-1873, 2000).

More recently, there has been considerable interest in the intensification of separation processes. In cyclic devices such as PSA and TSA, reducing cycle time is the primary means of achieving more production from a given quantity of material. However, as cycle time is reduced, cyclic devices usually face the problem of decreasing working capacity per cycle for the component of interest, decreasing product recovery, and increasing pressure drop.

Recent developments in PSA processes involve using complex structured adsorbents, such as relatively fast kinetically selective laminate adsorbent structures, to increase productivity. For example, U.S. Pat. No. 7,645,324 discloses a rotary PSA process using a laminated adsorbent for kinetic separation of gases. U.S. Pat. No. 7,645,324 teaches that the use of the kinetically selective laminate can allow for increased productivity, but in order to avoid the masking of kinetic selectivity by macropore mass transfer resistance, the macropore structure within the adsorbent layer should be as open as possible; i.e., the macropore void fraction should be relatively high. A problem in this respect, however, is that having a high void volume generally harms product recovery. Thus, it is to be expected that such improvements in productivity as may be obtained via use of such laminate structures would once again come at the expense of reduced product recovery. Also, when commercially available formed CMS adsorbents are milled to generate powder for creating laminate structure, the selective properties introduced by carbon deposition (distributed heterogeneously) is mostly lost, leaving a lower/unselective CMS with faster kinetics. Therefore, it seems impractical to make a CMS based laminate form of structured packing for a PSA process.

It is thus evident from the prior art that there is a trade-off between product recovery and process productivity; steps that are taken to increase product recovery are generally detrimental to process productivity, and vice versa.

Accordingly, there remains a need for PSA processes that have high process productivity whilst maintaining high product recovery.

SUMMARY

The present inventors have found that using "fast" kinetically selective CMS adsorbents in a rapid cycle pressure swing adsorption (PSA) process for separating $O_2$ from $N_2$ and/or Ar surprisingly gives rise to improved process productivity whilst still maintaining high product recovery, as compared to the rates of productivity and recovery obtainable when using "slower" but more selective and higher capacity CMS adsorbents.

Several preferred aspects of processes according to the present invention are outlined below.

Aspect 1: A rapid cycle pressure swing adsorption (PSA) process for separating $O_2$ from $N_2$ and/or Ar, wherein the process utilizes a plurality of adsorption beds comprising a carbon molecular sieve (CMS) adsorbent having an $O_2/N_2$ and/or $O_2/Ar$ kinetic selectivity of at least 5 and an $O_2$ adsorption rate (1/s) of at least 0.20 as determined by linear driving force model at 1 atma and 86° F., and wherein the process comprises subjecting each of the plurality of beds to a rapid PSA cycle comprising a feed step, at least one depressurization step, a purge step, and at least one re-pressurization step, the duration of the feed step being 60 seconds or less.

Aspect 2: The rapid cycle PSA process of Aspect 1, wherein the duration of the feed step is from 3 to 45 seconds.

Aspect 3: The rapid cycle PSA process of Aspect 1, wherein the duration of the feed step is from 6 to 45 seconds.

Aspect 4: The rapid cycle PSA process of Aspect 1, wherein the duration of the feed step is from 6 to 36 seconds.

Aspect 5: The rapid cycle PSA process of any one of Aspects 1 to 4, wherein the cycle time of the PSA cycle is 100 seconds or less.

Aspect 6: The rapid cycle PSA process of any one of Aspects 1 to 4, wherein the cycle time of the PSA cycle is 30 to 100 seconds.

Aspect 7: The rapid cycle PSA process of any one of Aspects 1 to 4, wherein the cycle time of the PSA cycle is 30 to 70 seconds.

Aspect 8: The rapid cycle PSA process of any one of Aspects 1 to 7, wherein the process utilizes 2 to 4 adsorption beds.

Aspect 9: The rapid cycle PSA process of any one of Aspects 1 to 7, wherein the process utilizes 2 adsorption beds.

Aspect 10: The rapid cycle PSA process of any one of Aspects 1 to 9, wherein the CMS has an $O_2/N_2$ kinetic selectivity of from 5 to 30 as determined by linear driving force model at 1 atma and 86° F.

Aspect 11: The rapid cycle PSA process of any one of Aspects 1 to 9, wherein the CMS has an $O_2/N_2$ kinetic selectivity of from 10 to 25 as determined by linear driving force model at 1 atma and 86° F.

Aspect 12: The rapid cycle PSA process of any one of Aspects 1 to 9, wherein the CMS has an $O_2/N_2$ kinetic selectivity of from 15 to 20 as determined by linear driving force model at 1 atma and 86° F.

Aspect 13: The rapid cycle PSA process of any one of Aspects 1 to 12, wherein the CMS has an $O_2/Ar$ kinetic selectivity of from 5 to 40 as determined by linear driving force model at 1 atma and 86° F.

Aspect 14: The rapid cycle PSA process of any one of Aspects 1 to 13, wherein the adsorbent beds comprise the CMS adsorbent in the form of random packing.

Aspect 15: The rapid cycle PSA process of Aspect 14, wherein adsorbent is dense loaded and held in place with a permeable hold down system.

Aspect 16: The rapid cycle PSA process of any one of Aspects 1 to 15, wherein the feed step is performed at a temperature of from about 0° F. to about 125° F.

Aspect 17: The rapid cycle PSA process of any one of Aspects 1 to 15, wherein the feed step is performed at a temperature of from about 20° F. to about 100° F.

Aspect 18: The rapid cycle PSA process of any one of Aspects 1 to 15, wherein the feed step is performed at a temperature of from about 20° F. to about 40° F.

Aspect 19: The rapid cycle PSA process of any one of Aspects 1 to 18, wherein the process is a rotary bed rapid cycle PSA process.

Aspect 20: The rapid cycle PSA process of any one of Aspects 1 to 18, wherein the process is a rotary valve rapid cycle PSA process.

Aspect 21: Use of a carbon molecular sieve (CMS) adsorbent in a rapid cycle pressure swing adsorption (PSA) process for separating $O_2$ from $N_2$ and/or Ar, wherein the CMS has an $O_2/N_2$ and/or $O_2/Ar$ kinetic selectivity of at least 5 and an $O_2$ adsorption rate (1/s) of at least 0.20 as determined by linear driving force model at 1 atma and 86° F.

Aspect 22: The use of Aspect 21, wherein the CMS has an $O_2/N_2$ kinetic selectivity of from 5 to 30 as determined by linear driving force model at 1 atma and 86° F.

Aspect 23: The use of Aspect 21, wherein the CMS has an $O_2/N_2$ kinetic selectivity of from 10 to 25 as determined by linear driving force model at 1 atma and 86° F.

Aspect 24: The use of Aspect 21, wherein the CMS has an $O_2/N_2$ kinetic selectivity of from 15 to 20 as determined by linear driving force model at 1 atma and 86° F.

Aspect 25: The use of Aspect 21, wherein the CMS has an $O_2/Ar$ kinetic selectivity of from 5 to 40 as determined by linear driving force model at 1 atma and 86° F.

BRIEF DESCRIPTION OF THE DRAWINGS

The present invention will hereinafter be described in conjunction with the appended figures wherein like numerals denote like elements.

DETAILED DESCRIPTION

Figure 1:
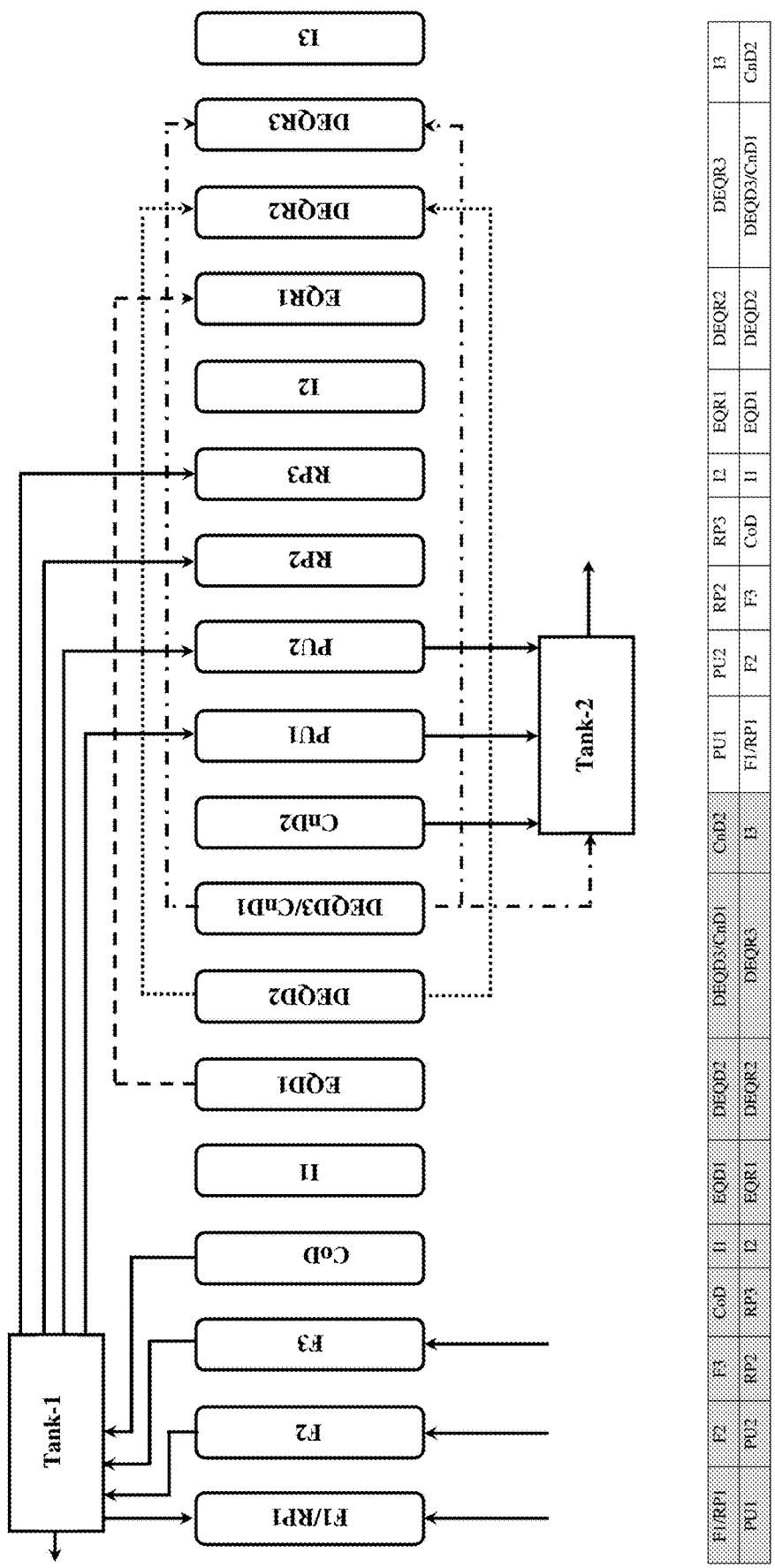
FIG. 1 shows the operation of a 2-bed multi-step PSA cycle.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, "first," "second," "third," etc. are used to distinguish from among a plurality of steps and/or features, and are not indicative of the total number, or relative position in time and/or space unless expressly stated as such.

As used herein, the term "comprising" means consisting of or including.

As used herein, the phrase "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

Disclosed herein are "fast" kinetically selective carbon molecular sieve (CMS) adsorbents for use in rapid cycle pressure swing adsorption (PSA) processes for separating $O_2$ from $N_2$ and/or Ar. Also disclosed herein are rapid cycle pressure swing adsorption (PSA) processes for separating $O_2$ from $N_2$ and/or Ar that utilize a plurality of adsorption beds comprising said fast kinetically selective CMS adsorbents.

The rapid cycle PSA processes described herein, that use the disclosed fast CMS adsorbents for separating $O_2$ from $N_2$ or Ar, have surprisingly been found to provide improved process productivity whilst maintaining high product recovery. Additionally, it has been found that the rapid cycle PSA processes using the fast CMS adsorbents require less purge gas.

As used herein, a "fast" kinetically selective CMS adsorbent (also referred to herein as simply a "fast" CMS adsorbent) refers to a CMS adsorbent having an $O_2/N_2$ and/or $O_2/Ar$ kinetic selectivity of at least 5 and an $O_2$ adsorption rate (1/s) of at least 0.20 as determined by linear driving force model at 1 atma and 86° F. More preferably, the fast CMS adsorbent has an $O_2$ adsorption rate (1/s) of at least 0.21, at least 0.22, at least 0.23, at least 0.24, at least 0.25, at least 0.26, at least 0.27, at least 0.28, at least 0.29, or at least 0.30, as determined by linear driving force model at 1 atma and 86° F.

As used herein, a "slow" kinetically selective CMS adsorbent (also referred to herein as simply a "slow" CMS adsorbent) refers to a CMS adsorbent having an $O_2/N_2$ and/or $O_2/Ar$ kinetic selectivity of at least 5 and an $O_2$ adsorption rate (1/s) of less than 0.20 as determined by linear driving force model at 1 atma and 86° F. for $O_2$.

The linear driving force (LDF) model is a well-known model for determining adsorption rates from experimental uptake curves, and can be used to calculate both the adsorption rates of particular adsorbates on a particular adsorbent, and the resulting kinetic selectivity of an adsorbent for particular adsorbate pairings.

More specifically, the rates of adsorption of an adsorbate (e.g. $O_2$, $N_2$, or Ar) on an adsorbent is evaluated using a standard volumetric adsorption apparatus. The experiment consists of exposing an adsorbent sample, which is initially at vacuum and 303 K (86° F.), to a measured amount of the adsorbate at 1 atma (760 Torr/101 kPa) at the same temperature. The change in pressure is recorded as a function of time. The pressure versus time data is then subtracted from a similar pressure history using the same weight of quartz beads in the place of the adsorbent sample to obtain a plot of the amount of gas adsorbed as a function of time, also known as an uptake curve. The LDF model is then used to extract the adsorption rates of the adsorbate in units of inverse time (1/s) from the uptake curve. The kinetic selectivity of the adsorbent for a particular adsorbate pairing can in turn be determined from the ratio of the calculated adsorption rate for the two adsorbates individually. The analytical form of the model is given by the following equation (as also set forth in Table 1 in the literature by Sircar, S. and Hufton, J. R., "*Why Does the Linear Driving Force Model for Adsorption Kinetics Work?*", *Adsorption* 2000, 6, 137-147) where f(t) is the fractional uptake, k is the LDF mass transfer coefficient, a is the correction factor for the constant volume experiment and t is the time.

$$f(t) = 1 - \exp^{-kt\frac{1+a}{a}}$$

Where the process is for separating $O_2$ from $N_2$, the fast CMS adsorbent may preferably have an $O_2/N_2$ kinetic selectivity of from 5 to 30, 10 to 25, or 15 to 20 as determined by linear driving force model at 1 atma and 86° F. Where the process is for separating $O_2$ from Ar, the fast CMS adsorbent may preferably have an $O_2/Ar$ kinetic selectivity of from 5 to 40. The fast CMS adsorbent may have any suitable adsorption capacity. For example it may have an adsorption capacity at equilibrium of between 0.2 to 0.4 mmol/g, as determined by standard isotherm measurement at 1 atma and 86° F.

As is well known, PSA processes involve subjecting each of the adsorbent beds used in the process to a PSA cycle comprising at least a feed step (also referred to as an adsorption step), at least one depressurization step, a purge step, and at least one re-pressurization step. In the feed step, a feed gas stream is introduced into and passed through the bed undergoing the feed step to adsorb one or more readily adsorbed components (i.e. $O_2$ in the present case) from the feed stream, thereby producing a product gas stream exiting the bed that is depleted in the adsorbed component and enriched in the remaining components (i.e. $N_2$ and/or Ar in the present case). In the depressurization steps the bed is depressurized down from the feed pressure during the feed step until a lower, purge pressure is reached, the depressurization steps typically including at least one depressurization equalization step (in which the bed is reduced in pressure by exhausting some of the gas in the bed and sending said gas to another bed that is undergoing an equalization re-pressurization step, thereby at least partially equalizing the pressure between the two beds), and a countercurrent depressurization or "blowdown" step, that typically takes place after said depressurization equalization steps, in which a gas enriched in the more readily adsorbed components is exhausted (typically in a counter-current direction) from the bed. In the purge step, a purge gas (typically some of the product gas produced in the adsorption step) is passed through the bed (typically in a counter-current direction), which is now at the aforementioned purge pressure, in order to remove remaining adsorbed components, this again resulting a gas stream enriched in said components being exhausted from the bed. Finally, in the re-pressurization steps the bed is pressurized back up to the feed pressure, the re-pressurization steps typically including at least one re-pressurization equalization step (in which the bed is increased in pressure by receiving gas from another bed that is undergoing an equalization depressurization step), and at least one step where the bed is re-pressurized with feed gas or product gas (or preferably both), the feed gas typically being introduced co-currently and the product gas counter-currently. As will be known, the cycle may include also other steps taking place between any of the steps described above.

As used herein in relation to a PSA cycle, a "co-current" step refers to a step in which gas flows into and/or out of the bed undergoing the step in a direction that is the same as the direction of flow of gas during the feed step. Likewise, a "counter-current" step refers to a step in which gas flows into and/or out of the bed undergoing the step in a direction that is the opposite of the direction of flow of gas during the feed step. Similarly, as used herein the "inlet" or "inlet" end of a bed refers to the inlet or end of the bed through which the feed gas enters during the feed step, and the "outlet" or "outlet" end of the bed refers to the outlet or end of the bed through which the product gas exits during the feed step.

As used herein, the term "rapid" PSA cycle means a PSA cycle in which the total duration of the feed step of the cycle is 60 seconds or less. Preferably the total duration of the feed step of the cycle is at least 3 seconds. Preferably the feed step has a total duration of from 3 to 45 seconds, or from 6 to 45 seconds, or 6 to 36 seconds.

The rapid PSA cycle preferably also has a cycle time of 100 seconds or less, the cycle time being the amount of time taken to complete one full set of steps of the PSA cycle (i.e. the feed step, the at least one depressurization step, the purge step, the at least one re-pressurization step, and any other steps as may be present in the cycle). More preferably the PSA cycle has a cycle time of from 30 to 100 seconds, or from 30 to 70 seconds.

The rapid cycle PSA process is carried out using a plurality of adsorption beds each comprising the fast CMS adsorbent. Any suitable number of beds may be used, but in certain embodiments the process uses from 2 to 4 adsorption beds only, or uses 2 beds only. In this regard, it should be noted that as used herein the term "adsorption bed" or "bed" refers to one or more vessels of adsorbent that are each undergoing each of the steps of the PSA cycle at the same time. Thus, a process that uses 2 beds has a first vessel or set of vessels that are all undergoing each step of the PSA cycle at the same time (this representing one of the beds), and has a second vessel or set of vessels that are all undergoing each step of the PSA cycle at the same time (this representing the other of the beds), the timing of the PSA cycle in the first vessel or set of vessels being however staggered from the timing of the PSA cycle in the second vessel or set of vessels such that each step of the PSA cycle in the first vessel or set of vessels does not start and finish at the same time as the start and finish of the corresponding step of the PSA cycle in the second vessel or set of vessels.

The adsorbent beds may be packed with the fast CMS adsorbent in any suitable form, but preferably comprise the CMS adsorbent in the form of random packing. The adsorbent should preferably be dense loaded and held in place with a permeable hold down system, such as a perforated plate with wire mesh facing the CMS to contain it and downward pressure applied, such as by springs. The dense loading prevents additional settling which would unload the springs. Dense loading may be achieved by methods known in the art, such as snowfall-type loading.

The feed step is typically performed at a temperature of about 0° F. to about 125° F., and more preferably at a temperature of about 20° F. to about 100° F. or about 20° F. to about 40° F. As used herein, the temperature at which the feed step is performed means the temperature of the feed gas being introduced into the adsorption bed, as measured at the inlet to the adsorption bed. Surprisingly, the present inventors have found that in the processes described and disclosed herein, performing the feed step of the process at a lower temperature (such as at about 30° F.) improves process productivity while at the same time maintaining or improving product recovery, which is contrary to known PSA systems. Performing the feed steps at such lower temperatures may be particularly beneficial where the feed gas is already available at a sub-ambient temperature (such as for example where the process is being used to separate oxygen and/or nitrogen from a crude argon stream obtained from a distillation column) and where significant cooling of the feed gas down to the desired temperature for the feed step is not required.

Any suitable feed pressure may be used during the feed step. For example, the pressure during the feed step, as measured at the inlet to the adsorption bed, may be from about 5 to about 12 atmospheres absolute.

The process may be performed using any suitable apparatus for carrying out rapid cycle PSA. Traditional switch valves will work up to a point. Preferably, however, the process is a rotary bed rapid cycle PSA process carried out using a rotary bed PSA apparatus (where the adsorption beds are mounted in a rotor that is positioned between and rotates relative to feed and product stator assemblies each containing stator plates that function as valve plates for switching the beds between PSA steps of the cycle), or is a rotary valve rapid cycle PSA process carried out using a rotary valve PSA apparatus (where conversely the adsorption beds are located in a fixed bed assembly and are switched between PSA steps by rotary feed and product valves that are known in the art).

Solely by way of example, an exemplary two-bed multi-step PSA cycle suitable for use with the processes of the present invention will now be described, with reference to FIG. 1. The cycle schedule is shown in FIG. 1 in tabular form. Each row of the table grid represents all the different cycle steps a given bed undergoes over the entire cycle, whereas a column of the grid represents which cycle step is being run by which bed at a particular unit time step. The total cycle time is the sum of all the individual unit time steps of a particular row. Note that in the cycle schedule, there is a highlighted section typically termed as "unit block" and within this block all the steps are being run by one of the multi-beds (Mehrotra et al., 2011). The number of repeated unit blocks is same as the number of beds. Typical cycle schedule formulation methodology can be found in the literature: "Mehrotra, A.; Ebner, A. D.; Ritter, J. A. Simplified Graphical Approach for Complex PSA Cycle Scheduling, *Adsorption*, 2011, 17 337-345". The salient features of all the cycle designs presented in FIG. 1 is summarized below.

The PSA cycle shown in FIG. 1 comprises a product and feed re-pressurization step (F1/RP1), a feed (F2, F3), a co-current depressurization step (CoD), co-current and dual equalization depressurization steps (EQD1, DEQD2, DEQD3), a counter-current depressurization step (CnD1, CnD2), a product purge step (PU1, PU2), a product re-pressurization step (RP2, RP3), a counter-current and dual equalization re-pressurization step (EQR1, DEQR2, DEQR3), and several idle steps (I1, I2, I3). In the product and feed re-pressurization (F1/RP1) step, the bed is pressurized to the highest-pressure level of the cycle with the addition of primary product (e.g. enriched $N_2$) and feed gas (e.g. air) from top and bottom end of the bed, respectively. No product is withdrawn from the bed during this step of the cycle. Next, in the feed step (F2 and F3 representing phases of the same feed step) the introduction of feed gas is continued until the mass transfer zone of preferentially adsorbed component (i.e. $O_2$) reaches the exit end of the bed without substantially breaking through it, and the un-adsorbed gas (e.g. purified $N_2$) is discharged from the outlet end of bed as primary product. Then, in the co-current depressurization step (CoD), the feed flow is stopped and the bed pressure is reduced to first intermediate level through extracting product from top end of the bed. Then, in a co-current equalization depressurization step (EQD1), the bed is connected with a bed undergoing the counter-current equalization re-pressurization step (EQR1), and a portion of the void as well as desorbed gas is transferred from the product end of the bed undergoing EQD1 to the product end of the bed undergoing EQR1, thus partially equalizing pressure between the two beds and lowering the bed pressure in the bed undergoing EQD1 to second intermediate level at the end of this step. Next, in the dual end equalization de-pressurization step (DEQD2), more co-adsorbed gas as well as void gases are withdrawn from top and bottom of the bed undergoing said step, bringing the pressure in said bed down to a third intermediate level, the gases withdrawn from the top and bottom of the bed being sent to respectively the top and bottom of the bed undergoing the dual equalization re-pressurization step (DEQR2). Next, the dual end equalization de-pressurization is continued in step (DEQD3/CnD1) but with some of the counter-currently withdrawn depressurization step being taken as secondary product (i.e. an $O_2$ enriched gas) rather than being used to re-pressurize another bed, this step further reducing the pressure of the bed to a fourth intermediate level. The bed is then counter-currently de-pressurized down to the lowest operating pressure in a counter-current depressurization step (CnD2), and purged at the lowest operating pressure in a purge step (PU1 and PU2), producing further secondary product. Thereafter, the bed is re-pressurized counter-currently with primary product gas in a counter-current re-pressurization step (RP2 and RP3). Following the re-pressurization step (RP2 and RP3), the column is further pressurized through pressure equalization re-pressurization steps (EQR1, DEQR2, and DEQR3) to bring the bed back to the pressure level for initiation and repetition of the cycle. Note that three idle steps (I1, I2, and I3) are also incorporated into the cycle schedule, during which the bed undergoing the idle step is isolated, the valves leading to it being in the closed position.

EXAMPLES

A 2-bed multi-step pressure swing adsorption (PSA) process cycle as shown in FIG. 1 was chosen to evaluate process performance indicators in terms of feed to product ratio and specific productivity using a fast (414-02) and a slow (414-04) carbon molecular sieve (CMS) adsorbents for separating nitrogen from air. The feed to product ratio is inverse of recovery, therefore, the lower the ratio, the better the recovery and vice versa. In other words, a lower feed to product ratio means lower power requirement for the compressor. The rates, kinetic selectivity, and equilibrium capacities of oxygen and nitrogen on the fast (414-02) and the slow (414-04) CMS adsorbents and characteristics of the adsorbent bed are summarized in Tables 1 and 2. Note that the oxygen uptake rate differs between the fast and slow CMS adsorbents by only 30%, but selectivity differs by a factor of 2.

Figure 2A:
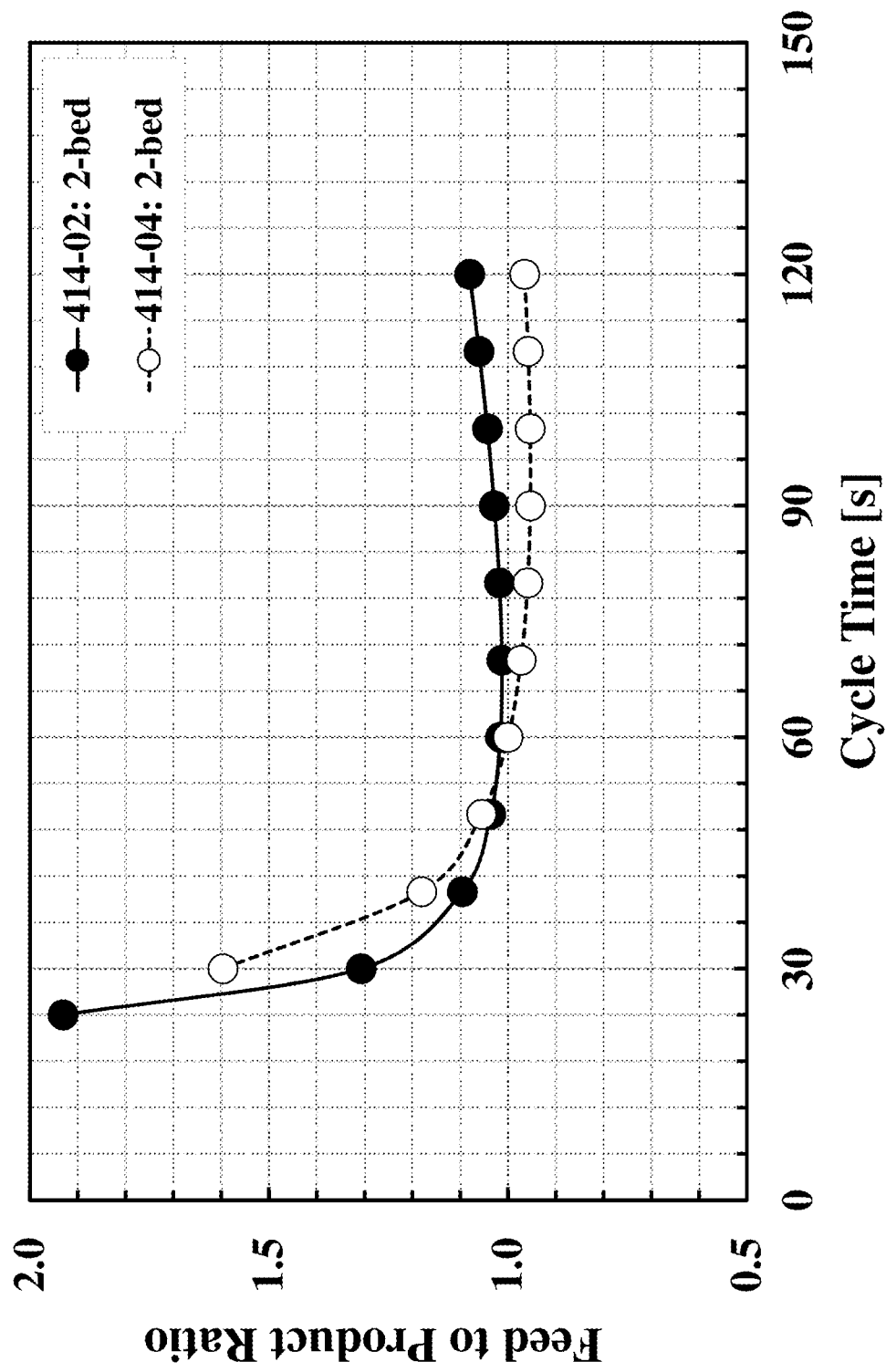
FIG. 2a is a graph showing normalized process performance in terms of feed to product ratio as function of cycle time for fast (414-02) and slow (414-04) CMS adsorbents using the 2-bed multi-step cycle presented in FIG. 1 for producing $N_2$ (containing 4500 ppm $O_2$) from air at 7.80 atma and 100° F.
Figure 2B:
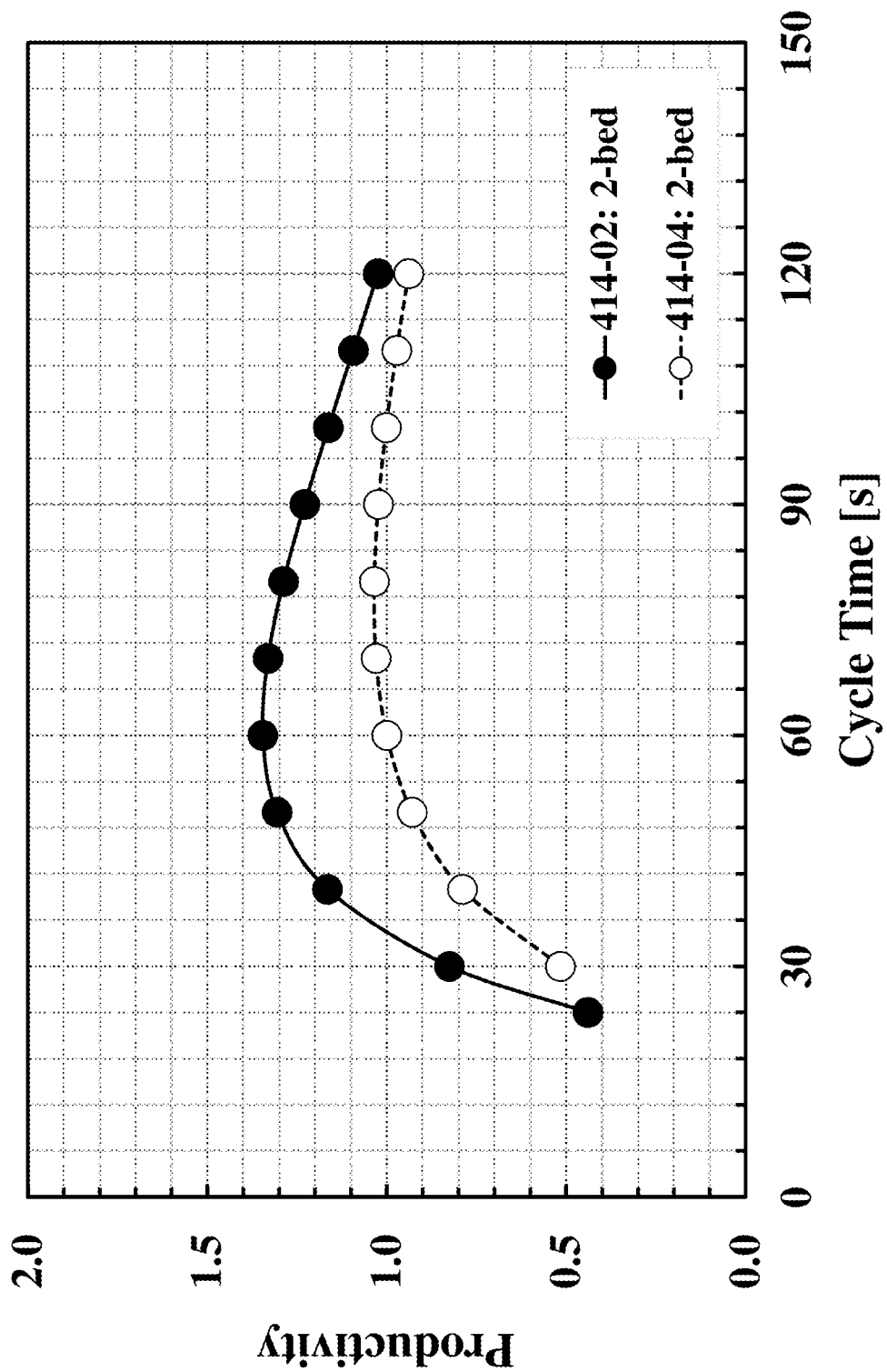
FIG. 2b is a graph showing normalized process performance in terms of productivity as function of cycle time for fast (414-02) and slow (414-04) CMS adsorbents using the 2-bed multi-step cycle presented in FIG. 1 for producing $N_2$ (containing 4500 ppm $O_2$) from air at 7.80 atma and 100° F.
Figure 3A:
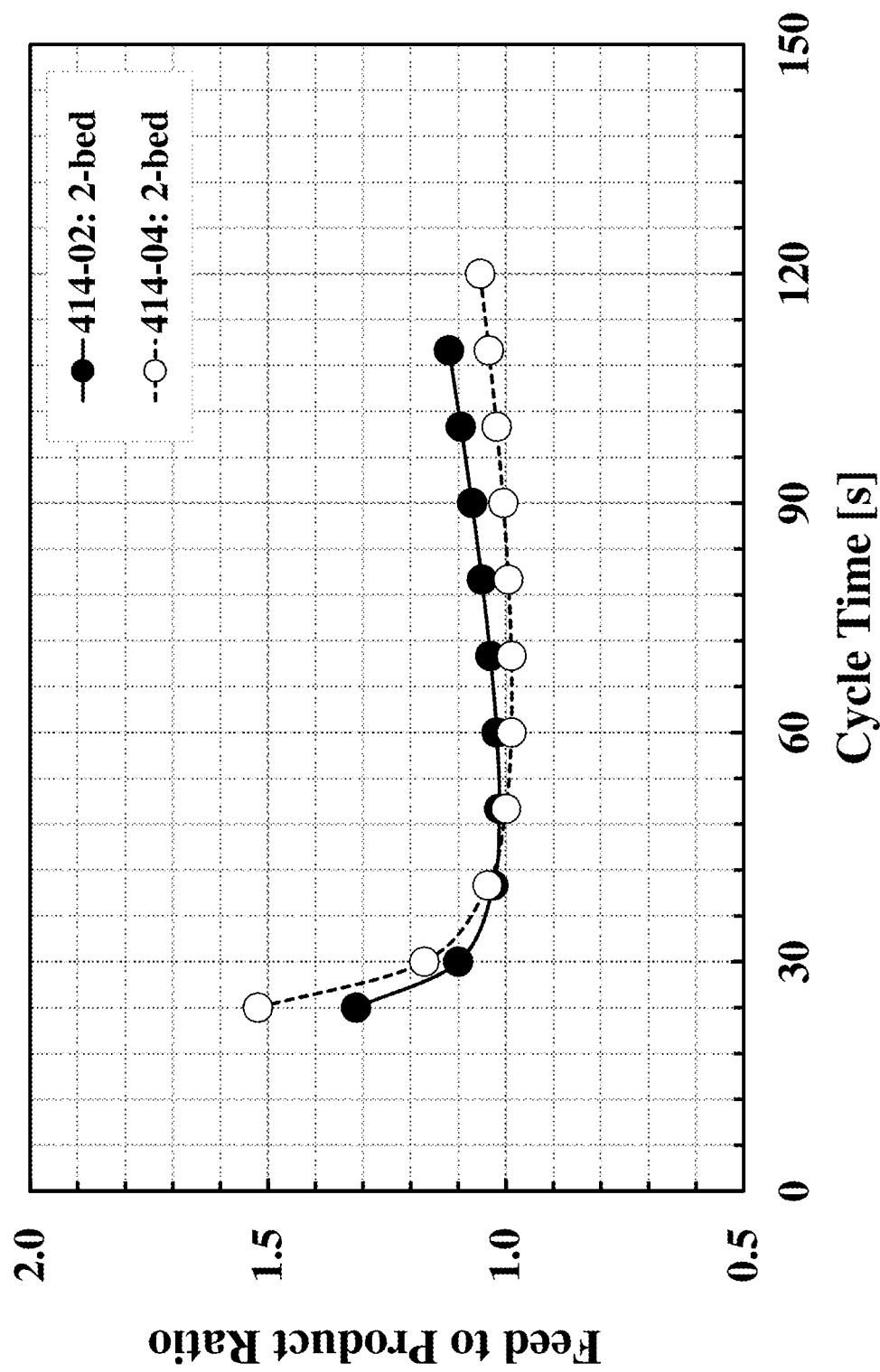
FIG. 3a is a graph showing normalized process performance in terms of feed to product ratio as function of cycle time for fast (414-02) and slow (414-04) CMS adsorbents using the 2-bed multi-step cycle presented in FIG. 1 for producing $N_2$ (containing 45,000 ppm $O_2$) from air at 7.80 atma and 100° F.
Figure 3B:
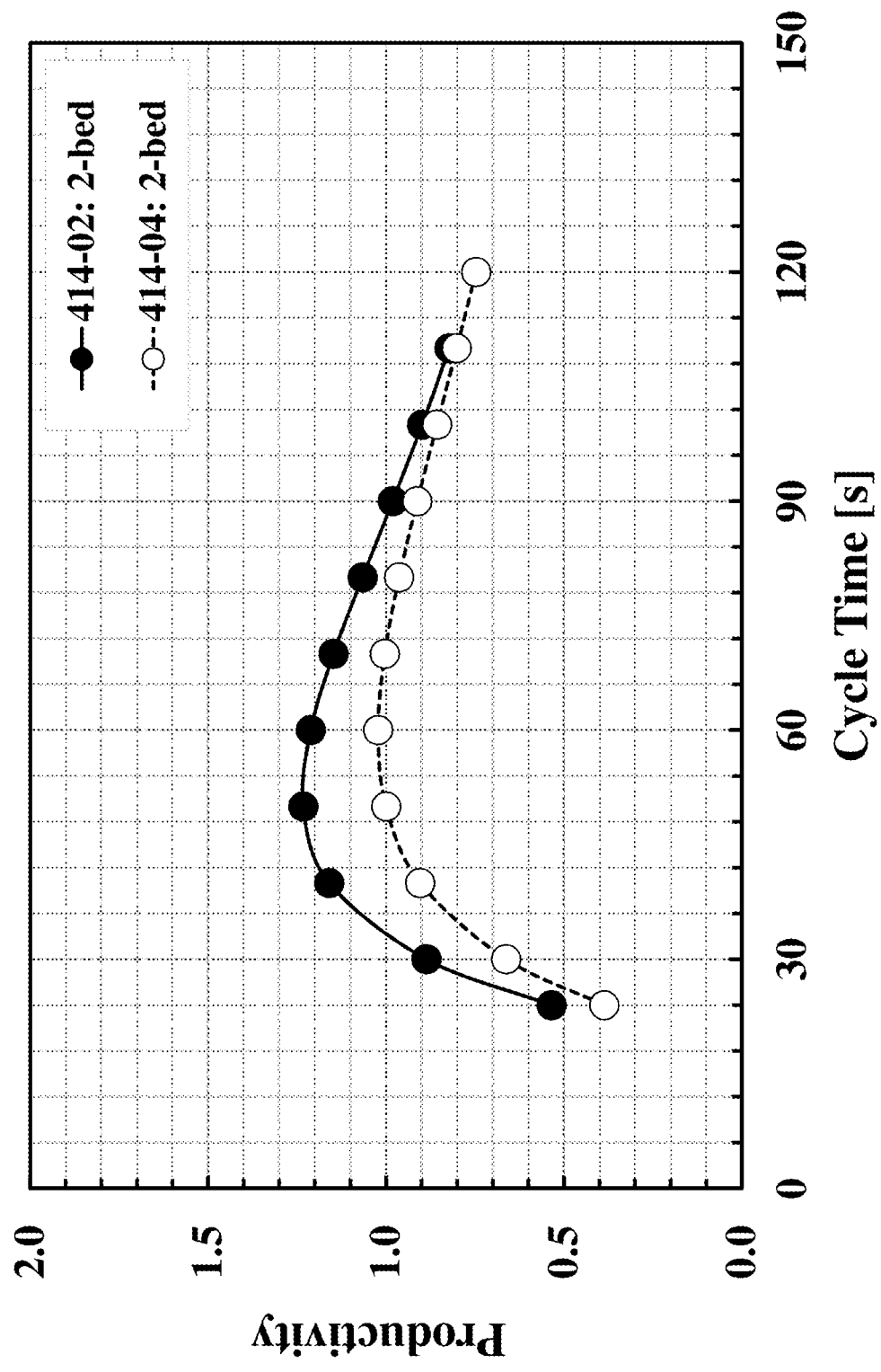
FIG. 3b is a graph showing normalized process performance in terms of productivity as function of cycle time for fast (414-02) and slow (414-04) CMS adsorbents using the 2-bed multi-step cycle presented in FIG. 1 for producing $N_2$ (containing 45,000 ppm $O_2$) from air at 7.80 atma and 100° F.
Figure 4A:
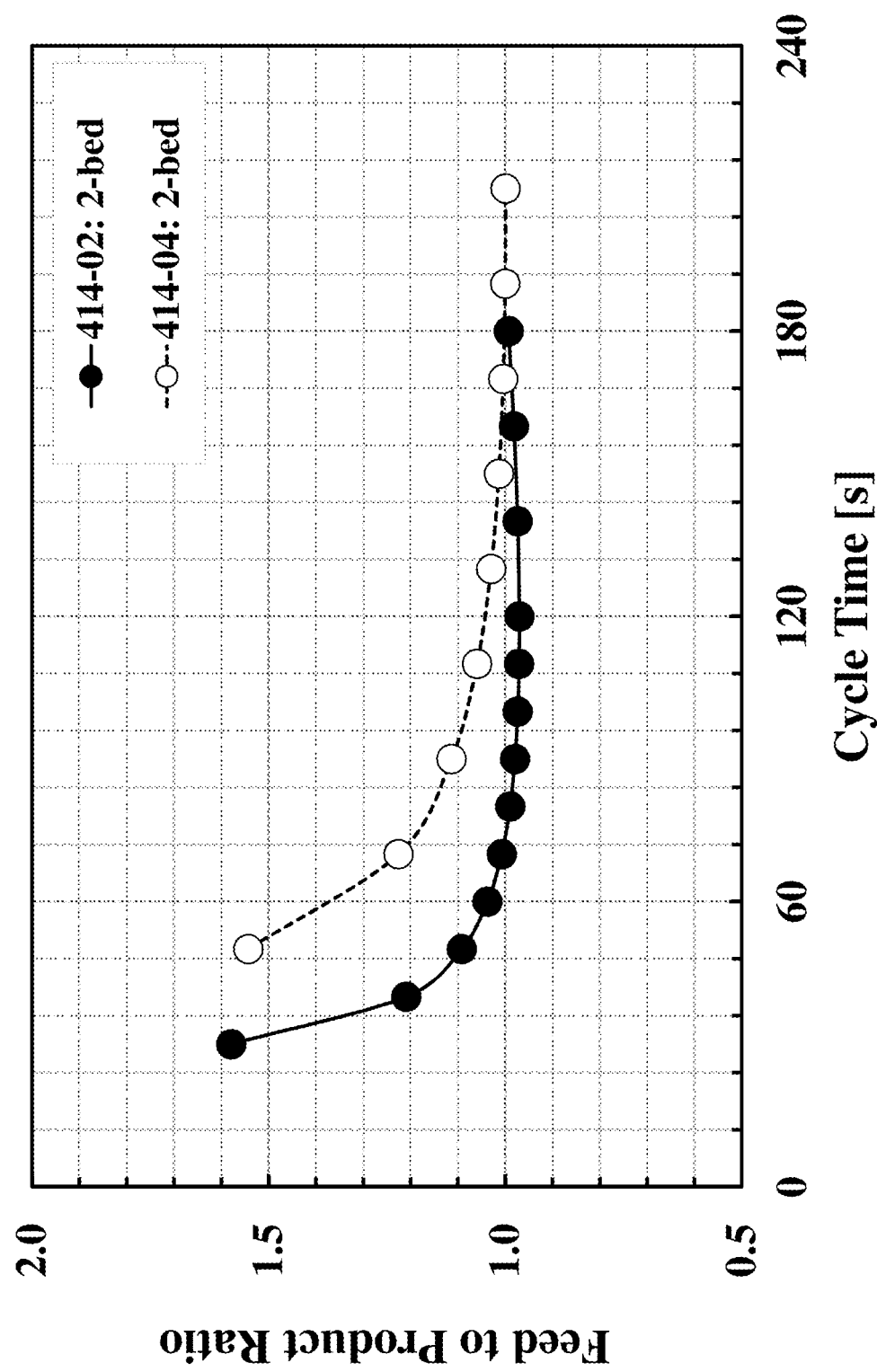
FIG. 4a is a graph showing normalized process performance in terms of feed to product ratio as function of cycle time for fast (414-02) and slow (414-04) CMS adsorbents using the 2-bed multi-step cycle presented in FIG. 1 for producing $N_2$ (containing 4500 ppm $O_2$) from air at 7.80 atma and 30° F.
Figure 4B:
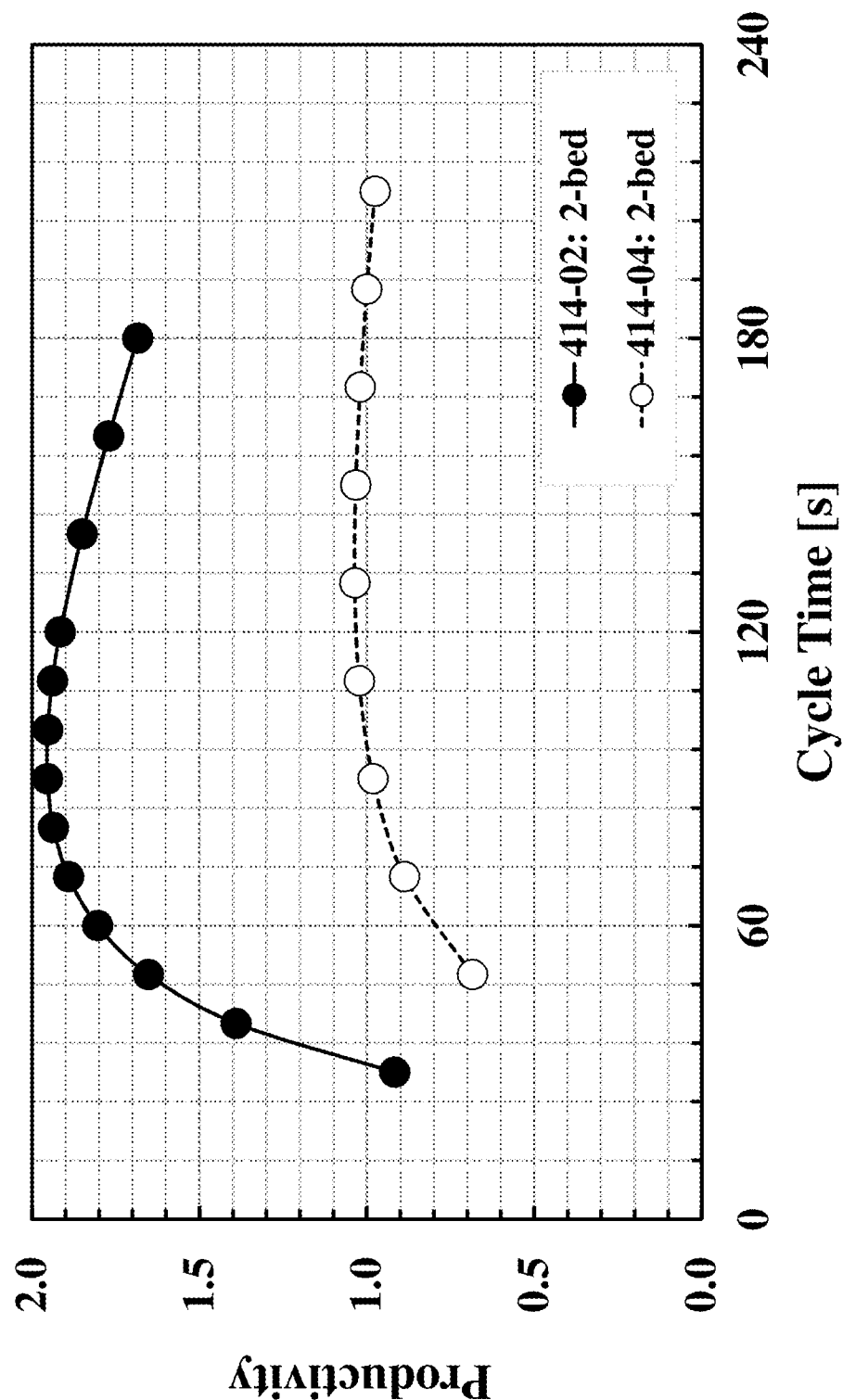
FIG. 4b is a graph showing normalized process performance in terms of productivity as function of cycle time for fast (414-02) and slow (414-04) CMS adsorbents using the 2-bed multi-step cycle presented in FIG. 1 for producing $N_2$ (containing 4500 ppm $O_2$) from air at 7.80 atma and 30° F.

The PSA process performance results, in terms of feed to product ratio and productivity for different $N_2$ product purities (containing 4500 ppm and 45,000 ppm $O_2$) and when using different feed step temperatures (100° F. and 30° F.), are summarized in FIGS. 2 (a and b), FIGS. 3 (a and b) and FIGS. 4 (a and b) for the fast (414-02) and slow (414-04) CMS adsorbents. In these figures, the feed to product ratio and productivity have been normalized by dividing by the representative values for 414-04 at the conditions given in Table 3 and those normalized values are plotted as a function of cycle time. For each adsorbent the PSA process parameters were individually optimized to generate these plots. In Table 3, the cycle times were 60 seconds for both 414-02 and 414-04 for the 100° F., 4500 ppm case and 50 seconds for the 100° F., 45,000 ppm case. For the 30° F. comparison, 414-02 was run at 90 seconds cycle time and 414-04 was run at 190 seconds. In all cases the pressure during the feed step, as measured at the inlet to the adsorption bed, was 7.80 atma.

As seen in FIGS. 2 to 4, the optimum cycle time for the fast CMS (414-02) was equal to or faster than that for the slow CMS (414-04) at all $N_2$ product purities (containing different amount of $O_2$) and temperatures. The surprising feature with the fast CMS (414-02) is that significantly better productivity (34.5% better at 100° F. and 4500 ppm $O_2$, 23.2% better at 100° F. and 45,000 ppm $O_2$ and 95.4% better at 30° F. and 4500 ppm $O_2$) at similar recovery (i.e., similar feed to product ratio) can be maintained at all product purities and temperatures considered here versus the slow CMS (414-04), even though the kinetic selectivity and equilibrium capacity of the fast CMS is considerably lower than the slow CMS. This means that the bed size, and therefore the capital cost, can be reduced with the use of fast carbon molecular sieve in a PSA process.

Another surprising feature for the fast CMS (414-02) was that at cold operating temperature, much higher productivity can be obtained while still maintaining similar or better recovery (i.e. lower feed to product ratio). For example, at 7.80 atma bed pressure and 4500 ppm $O_2$ in product stream, the normalized feed to product ratio and normalized productivity are 0.979 and 1.954, respectively at 30° F. operating temperature and 90 seconds cycle time. Even at 100° F. and 60 seconds cycle time with the same operating pressure and product $O_2$ purity, the normalized feed to product ratio for 414-02 was only 1.6% higher than 414-04 and the normalized productivity for 414-02 was still 34.5% higher than for 414-04. The slow CMS (414-04) gave about 26% reduction in productivity with about 12% gain in recovery going from 100° F. to 30° F. feed temperature. In contrast, the fast CMS (414-02) showed a 6.7% increase in productivity with a 16% gain in recovery going from 100° F. to 30° F. feed temperature. The comparative results can be found in Table 3 as well as in FIGS. 2 (a and b) and 4 (a and b).

The amount of purge gas needed to effectively regenerate the bed is surprisingly lower for the production of moderate purity nitrogen by PSA using the fast CMS (414-02), even though it has lower selectivity than 414-04. Even with the lower purge gas, the process performance indicators for the fast CMS are significantly better than those of the slow CMS. A summary of purge to feed ratio (in terms of ACF ratio) is provided in Table 3 for different product purities (containing different amount of $O_2$) and temperatures for the fast and slow CMS adsorbents. For the fast CMS, the purge to feed ratio is about 43% lower at 100° F. and about 8% lower at 30° F. versus the slow CMS adsorbent. Note that part of the primary product enriched in slower diffusing component (nitrogen in case of air separation by CMS based PSA) is used to execute a countercurrent purge step (PU1 and PU2 steps as shown in FIG. 1) following the countercurrent blowdown step (CnD1 and CnD2 steps as shown in FIG. 1) at low pressure. The purge step is necessary to make sure that the bed is sufficiently clean in order to produce primary product at certain purity during the production step.

As mentioned previously, the uptake rates for all the diffusing components on the fast CMS (414-02) are faster than those on the slow CMS (414-04). The fast CMS adsorbent considered in these studies was approximately 25% faster than the slow CMS absorbent, but 58% less selective (based on kinetic selectivity) than the slow CMS adsorbent (Table 1). Nevertheless, in the rapid cycle process the fast CMS adsorbent not only provided a higher specific productivity (as might be expected in view of its faster uptake rates) but it achieved this with no/minimum loss in recovery (i.e. similar feed to product ratio) despite its lower selectivity, as can be seen from Table 3.

The enhancement in specific productivity with no/minimum loss in recovery is very surprising, as it runs contrary to that which was previously known in the art. In a study by Schork et al. (1993), it was mentioned that productivity would increase as the uptake rates are increased, but that the maximum obtainable recovery would decrease. Table 4 (data obtained from Schork et al.) summarizes the effect of overall rate constant of $O_2$ and $N_2$ on process performance indicators (recovery and productivity) on a carbon molecular sieve adsorbent from this study, which clearly shows that increasing productivity is to the detriment of product recovery.

While the principles of the invention have been described above in connection with preferred embodiments, it is to be clearly understood that this description is made only by way of example and not as a limitation of the scope of the invention.

TABLE 1

Summarizes linear driving force (LDF) model based $O_2$ rate constants and $O_2$ over $N_2$ kinetic selectivity for different carbon molecular sieve adsorbents at 1 atma and 86° F.

| CMS | Description | LDF rate constant for $O_2$ (1/s) | $O_2/N_2$ kinetic selectivity | Equilibrium capacity (mmol/gm) |
|---|---|---|---|---|
| 414-02 | Fast CMS | 0.2204 | 16.21 | 0.2559 |
| 414-04 | Slow CMS | 0.1761 | 38.28 | 0.3138 |
| 414-05 | Fast CMS | 0.2613 | 27.30 | 0.2822 |
| 414-06 | Fast CMS | 0.3426 | 24.08 | 0.3344 |

TABLE 2

Summarizes adsorbent and bed characteristics for a fast (414-02) and a slow (414-04) carbon molecular sieve adsorbents.

| Adsorbent Characteristics | | |
|---|---|---|
| Adsorbent type (—) | 414-02 | 414-04 |
| Adsorbent diameter (ft) | 0.0043 | 0.0032 |
| Total void fraction (—) | 0.5311 | 0.6451 |
| Interstitial void fraction (—) | 0.3019 | 0.3336 |
| Bulk density (lb/ft³) | 41.92 | 42.89 |
| LDF rate constant at 1.0 atma & 86° F. for | | |
| Oxygen (1/s) | 0.2204 | 0.1761 |

TABLE 2-continued

Summarizes adsorbent and bed characteristics for a fast (414-02) and a slow (414-04) carbon molecular sieve adsorbents.

| | | |
|---|---|---|
| Nitrogen (1/s) | 0.0136 | 0.0046 |
| Argon (1/s) | 0.0092 | 0.0027 |
| $O_2/N_2$ kinetic selectivity | 16.21 | 38.28 |
| Bed Characteristics | | |
| Bed length (in) | 40 | 40 |
| Bed inside diameter (in) | 4 | 4 |

TABLE 3

Summarizes purge requirement (in terms of purge to feed ratio) for the fast (414-02) and slow (414-04) CMS adsorbents at different operating temperatures and product $O_2$ purities. The feed to product ratio and productivity values have been normalized by the 414-04 values for the same temperature, pressure, and product $O_2$ conditions. The adsorbent and bed characteristics are summarized in Table 2. The 2-bed multi-step cycle presented in FIG. 1 is used for the evaluation.

| Adsorbent | Pressure (atma) | Temperature (° F.) | Cycle time (s) | Product $O_2$ (ppm) | Feed to product ratio | Productivity | Purge to feed ratio |
|---|---|---|---|---|---|---|---|
| 414-02 | 7.80 | 100 | 50 | 45000 | 1.014 | 1.232 | 0.043 |
| | | | 60 | 4500 | 1.016 | 1.345 | 0.049 |
| | | 30 | 90 | 4500 | 0.979 | 1.954 | 0.126 |
| 414-04 | 7.80 | 100 | 50 | 45000 | 1.000 | 1.000 | 0.076 |
| | | | 60 | 4500 | 1.000 | 1.000 | 0.087 |
| | | 30 | 190 | 4500 | 1.000 | 1.000 | 0.138 |

TABLE 4 summarizes the effect of overall rate constant of $O_2$ and $N_2$ process performance indicators (recovery and productivity) on a carbon molecular sieve adsorbent. The rate constants are multiplied by a single factor, therefore in all cases, the kinetic selectivity is the same as that of the base case. The results are taken from "Schork, J. M.; Srinivasan, R.; Auvil, S. R. Shortcut Computational Method for Designing Na PSA Adsorbents, *Ind. Eng. Chem. Res.*, 1993, 32, 2226-2235".

| Factor for rate constant | Feed step time (s) | Performance relative to base case (%) | |
|---|---|---|---|
| | | Recovery | Productivity |
| 1.0 | 120 | | |
| 1.5 | 90 | −2 | +30 |
| 2.0 | 70 | −5 | +58 |
| 2.5 | 60 | −7 | +77 |
| 3.0 | 50 | −10 | +100 |
| 4.0 | 45 | −11 | +118 |

The invention claimed is:

1. A rapid cycle pressure swing adsorption (PSA) process for separating $O_2$ from $N_2$ and/or Ar, wherein the process utilizes a plurality of adsorption beds comprising a carbon molecular sieve (CMS) adsorbent having an $O_2/N_2$ and/or $O_2/Ar$ kinetic selectivity of at least 5 and an $O_2$ adsorption rate (1/s) of at least 0.20 as determined by linear driving force model at 1 atma and 86° F., and wherein the process comprises subjecting each of the plurality of beds to a rapid PSA cycle comprising a feed step, at least one depressurization step, a purge step, and at least one re-pressurization step, the duration of the feed step being 60 seconds or less.

2. The rapid cycle PSA process of claim 1, wherein the duration of the feed step is from 3 to 45 seconds.

3. The rapid cycle PSA process of claim 1, wherein the duration of the feed step is from 6 to 45 seconds.

4. The rapid cycle PSA process of claim 1, wherein the duration of the feed step is from 6 to 36 seconds.

5. The rapid cycle PSA process of claim 1, wherein the cycle time of the PSA cycle is 100 seconds or less.

6. The rapid cycle PSA process of claim 1, wherein the cycle time of the PSA cycle is 30 to 100 seconds.

7. The rapid cycle PSA process of claim 1, wherein the cycle time of the PSA cycle is 30 to 70 seconds.

8. The rapid cycle PSA process of claim 1, wherein the process utilizes 2 to 4 adsorption beds.

9. The rapid cycle PSA process of claim 1, wherein the process utilizes 2 adsorption beds.

10. The rapid cycle PSA process of claim 1, wherein the CMS has an $O_2/N_2$ kinetic selectivity of from 5 to 30 as determined by linear driving force model at 1 atma and 86° F.

11. The rapid cycle PSA process of claim 1, wherein the CMS has an $O_2/N_2$ kinetic selectivity of from 10 to 25 as determined by linear driving force model at 1 atma and 86° F.

12. The rapid cycle PSA process of claim 1, wherein the CMS has an $O_2/N_2$ kinetic selectivity of from 15 to 20 as determined by linear driving force model at 1 atma and 86° F.

13. The rapid cycle PSA process of claim 1, wherein the CMS has an $O_2/Ar$ kinetic selectivity of from 5 to 40 as determined by linear driving force model at 1 atma and 86° F.

14. The rapid cycle PSA process of claim 1, wherein the adsorbent beds comprise the CMS adsorbent in the form of random packing.

15. The rapid cycle PSA process of claim 14, wherein adsorbent is dense loaded and held in place with a permeable hold down system.

16. The rapid cycle PSA process of claim 1, wherein the feed step is performed at a temperature of from about 0° F. to about 125° F.

17. The rapid cycle PSA process of claim 1, wherein the feed step is performed at a temperature of from about 20° F. to about 100° F.

18. The rapid cycle PSA process of claim 1, wherein the feed step is performed at a temperature of from about 20° F. to about 40° F.

19. The rapid cycle PSA process of claim 1, wherein the process is a rotary bed rapid cycle PSA process.

20. The rapid cycle PSA process of claim 1, wherein the process is a rotary valve rapid cycle PSA process.

21. Use of a carbon molecular sieve (CMS) adsorbent in a rapid cycle pressure swing adsorption (PSA) process for separating $O_2$ from $N_2$ and/or Ar, wherein the CMS has an $O_2/N_2$ and/or $O_2/Ar$ kinetic selectivity of at least 5 and an $O_2$ adsorption rate (1/s) of at least 0.20 as determined by linear driving force model at 1 atma and 86° F.

22. The use of claim 21, wherein the CMS has an $O_2/N_2$ kinetic selectivity of from 5 to 30 as determined by linear driving force model at 1 atma and 86° F.

23. The use of claim 21, wherein the CMS has an $O_2/N_2$ kinetic selectivity of from 10 to 25 as determined by linear driving force model at 1 atma and 86° F.

24. The use of claim 21, wherein the CMS has an $O_2/N_2$ kinetic selectivity of from 15 to 20 as determined by linear driving force model at 1 atma and 86° F.

25. The use of claim 21, wherein the CMS has an $O_2/Ar$ kinetic selectivity of from 5 to 40 as determined by linear driving force model at 1 atma and 86° F.

\* \* \* \* \*